United States Patent
Kettelson

Patent Number: 5,168,976
Date of Patent: Dec. 8, 1992

[54] CUSHIONED STOP FOR POWERED CONVEYOR

[75] Inventor: Russell W. Kettelson, Drayton Plains, Mich.

[73] Assignee: Newcor, Inc., Warren, Mich.

[21] Appl. No.: 836,989

[22] Filed: Feb. 14, 1992

[51] Int. Cl.⁵ ............................................. B65G 21/20
[52] U.S. Cl. .............................. 198/345.3; 198/345.1; 198/633; 193/35 A
[58] Field of Search ................... 198/345.1, 345.3, 633, 198/634, 463.4; 193/32, 35 A, 40

[56] References Cited

U.S. PATENT DOCUMENTS

| | | | |
|---|---|---|---|
| 3,696,756 | 10/1972 | Elmore et al. | 104/251 |
| 3,917,044 | 11/1975 | Brown | 193/35 A X |
| 4,829,229 | 9/1981 | Keller | 193/35 A X |
| 4,397,386 | 8/1983 | Kampf | 193/35 A X |
| 4,489,824 | 12/1984 | Scourtes | 198/633 |
| 4,687,091 | 8/1987 | Sticht | 198/345.3 |
| 4,703,843 | 11/1987 | Dixon | 198/345.3 |
| 5,070,987 | 12/1991 | Koltookian | 193/35 A X |

FOREIGN PATENT DOCUMENTS

| | | | |
|---|---|---|---|
| 3229191 | 2/1984 | Fed. Rep. of Germany | 198/633 |
| 0028418 | 1/1990 | Japan | 198/345.3 |
| 1447717 | 12/1988 | U.S.S.R. | 198/633 |

OTHER PUBLICATIONS

Article entitled "*Machine Design*" magazine, Penton Publishing, Inc., Sep. 21, 1989, 6 pages.

Primary Examiner—Robert P. Olszewski
Assistant Examiner—James R. Bidwell
Attorney, Agent, or Firm—Flynn, Thiel, Boutell & Tanis

[57] ABSTRACT

A stop mechanism mountable on a powered conveyor, such as a conveyor having continuously-driven drive rollers which support and drivingly move loads such as pallets. The stop mechanism is mounted directly under and between sidewardly-spaced drive rollers to permit use of through shafts between sidewardly-spaced pairs of drive rollers. The stop mechanism has a vertically-oriented stop lever which projects upwardly for contacting a moving load, which contact effects limited vertical swinging of the lever into engagement with a fixed stop. The lever is coupled to a hydraulic shock absorber which effects rapid deceleration of the load to cause cushioned contact thereof with the fixed stop. The shock absorber preferably has an internal orifice arrangement associated with a pressure chamber which results in the orifice flow area progressively decreasing as the stop lever is moved by the load to provide more optimum control over liquid pressure and control over the resistance force imposed against the load. The stop lever is movable downwardly to disengage the load, and is spring urged upwardly to permit engagement with the next load.

20 Claims, 5 Drawing Sheets

CUSHIONED STOP FOR POWERED CONVEYOR

FIELD OF THE INVENTION

This invention relates to an improved shock-absorbing stop device for use in cushioning and stopping heavy loads, such as pallets associated with a powered conveyor.

BACKGROUND OF THE INVENTION

In certain industries, such as the automotive industry, it is conventional to move workpieces on a powered conveyor from station to station so as to permit sequential manufacturing operations to be carried out. The workpiece is typically mounted on a support pallet, and the pallet is moved from station to station by a powered conveyor. Such powered conveyor typically employs driven support rolls which support and drive the pallet from station to station. These conveyor rolls are continuously driven, and the pallet is typically stopped at the selected station by some type of stop device. This stop device is then required to stationarily and accurately hold the pallet at the selected workstation to permit the desired manufacturing and/or assembling operation to be carried out, or permit a precision-pallet locating device to engage the pallet, while at the same time the powered rolls continue to try to drive the pallet forwardly.

The conventional stop devices which are often employed involve a combination of heavy-duty springs and a solid (i.e. mechanical) stop. With such devices, however, the impact forces imposed on the stop, and also on the pallet, are often times excessive. Further, if heavy springs are utilized in an attempt to cushion the stoppage of the pallet, then these springs tend to urge the stopped pallet backwardly away from the stop, and such is obviously undesirable, and thus an anti-backup latch device is often required.

In an attempt to provide more successful cushioning of the pallet during stoppage thereof, some devices utilized air springs. Such attempts have met with only limited success in view of the limited force-absorbing character of such devices. Such devices also typically require anti-backup latch devices and/or sophisticated control systems to control air exhaust to prevent bounce back.

Other attempts to provide proper cushioning of the pallet have involved use of hydraulic shocks or cylinders. Examples of such devices are illustrated by U.S. Pat. No. 4,703,843 issued to Dixon, and U.S. Pat. No. 3,696,756 issued to Elmore et al. The Dixon device, however, involves both a complicated structure and a complex movement pattern, particularly a multiple-position movement pattern for the stop including both a stopping position and a fixturing position, whereby this device does not possess the desired degree of structural and operational simplicity. The Elmore et al device positions a hydraulic dashpot directly for contact with the moving load, and hence this device requires a support mechanism which permits the entire dashpot to be moved into and out of a position of contact with the load, thereby requiring undesired structural and functional complexities. Further, neither Dixon nor Elmore et al utilize hydraulic shock absorbers which are capable of providing proper stopping force over the stoppage distance, particularly as the load approaches the solid stop, so as to provide for more controlled and cushioned stoppage of the workpiece to minimize the impact against the solid stop.

Accordingly, it is an object of this invention to provide an improved cushioned stopping device suitable for stopping a moving load as associated with a continuously powered conveyor, which stopping device incorporates a hydraulic shock absorber which can provide for more controlled and cushioned stoppage of a moving load.

It is a further object of the present invention to provide an improved stopping device, as aforesaid, which minimizes the structural and functional complexities of the device and in particular simplifies the required movement of the elements thereof, which provides simple and reliable operation, and is economical for manufacture and assembly.

It is still a further object of the invention to provide an improved stopping device, as aforesaid, which can be mounted on a powered conveyor in such manner as to permit utilization of continuous through shafts extending sidewardly between opposite side rolls of the conveyor, rather than requiring use of stub shafts as is typical with many prior art structures, with the improved stopping device being mountable on the conveyor below the through shafts and having a stopping structure which can be positioned to project upwardly between the shafts to permit successful engagement and stoppage of the moving load, with the device employing a hydraulic shock absorber which is positioned downwardly below the through shafts.

Other objects and purposes of the invention will be apparent to persons familiar with structures and devices of this general type upon reading the following specification and inspecting the accompanying drawings.

SUMMARY OF THE INVENTION

The cushioned stopping device of this invention, in a preferred embodiment, possesses a cradle-like support housing connected to the conveyor frame, such as below the support shafts for the conveyor rolls. The support housing defines, adjacent one end thereof, an upwardly opening channel in which a stop structure is movably supported. This stop structure includes a generally vertically-elongated stop lever having an upper end adapted to abutting contact a forwardly-facing surface on the load or pallet when the stop lever is in a raised or activated position. The lower end of the stop lever is pivotally supported on a slide structure so that the stop lever can vertically pivot in the upstream direction of the conveyor away from a mechanical stop. The stop structure is vertically slidably supported on the support housing to permit lowering of the stop lever into a lowered or deactivated position wherein the stop lever cannot contact a front surface of the pallet. A hydraulic shock absorber has one end thereof pivotally connected to the stop lever substantially intermediate the ends thereof so that the shock absorber imposes a restraining force of the stop lever in substantially perpendicular relationship thereto, and this shock absorber has the other end thereof supported by pivots or trunnions of the support housing. The shock absorber is positioned so that it can be positioned between sidewardly-spaced conveyor rolls but below the through shafts which extend between the sidewardly-spaced rolls. A vertical control structure is coupled to the slide structure for controlling vertical displacement of the latter between raised and lowered positions. This control structure involves a generally horizontally-elongated lever arrangement which is pivotally supported on the support housing. This control lever at a forward end thereof has a generally horizontal slot in which a guide block portion is generally horizontally slidably confined, which latter guide block portion comprises a part of the vertical slide structure. The other end of the control lever is acted on by an activating device which controls the overall vertical displacement of the stop structure between its raised and lowered positions. This activating device includes a fluid pressure cylinder which acts upwardly against the remote end of the control lever to effect swinging thereof and corresponding downward movement of the slide structure and of the stop lever to effect movement of the latter into its lower position wherein it releases the load and hence is in a non-load engaging position. This activating device also includes springs which exert a continuous downward biasing force on the remote end of the control lever and tend to continuously urge the slide structure and the stop lever upwardly toward the raised position whenever the fluid pressure cylinder is deactivated. The activating device is secured to the support housing and projects vertically downwardly therefrom at the end thereof remote from the stop lever, whereby the activating device does not interfere with the through shafts or the drive rolls associated therewith.

BRIEF DESCRIPTION OF THE DRAWINGS

FIG. 1A is a fragmentary sectional view which illustrates one exemplary embodiment of the internal structure of the hydraulic shock absorber associated with the stopping device.

DETAILED DESCRIPTION

Figure 1:
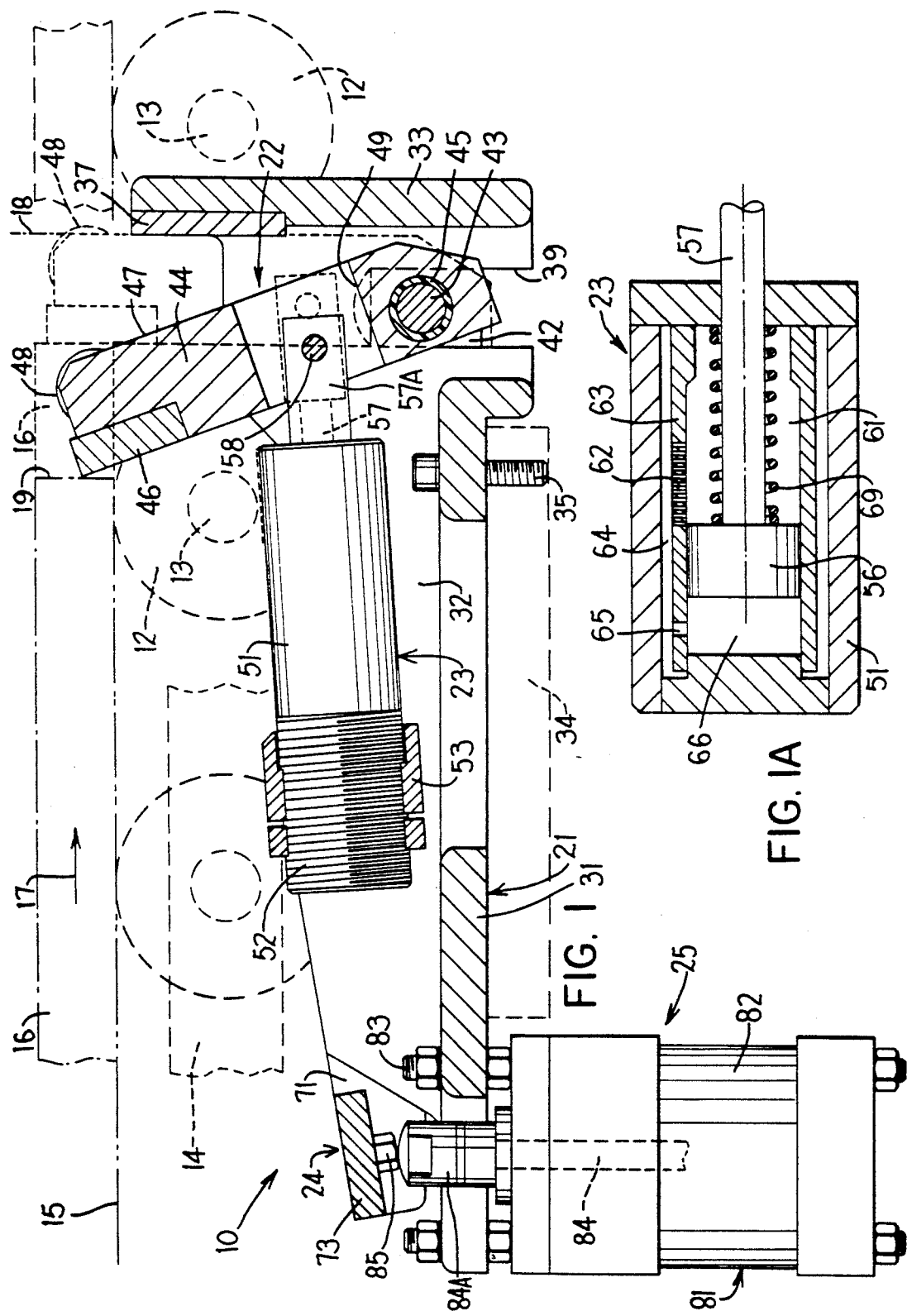
FIG. 1 is a central side sectional view illustrating the cushioned stopping device of the present invention as associated with a continuously powered roll conveyor. The solid line position illustrated by FIG. 1 shows the stopping device in its activated raised position for engaging the leading edge of a moving pallet, and the dotted position illustrates the stopping device in its activated raised position after having stopped the pallet.
Figure 2:
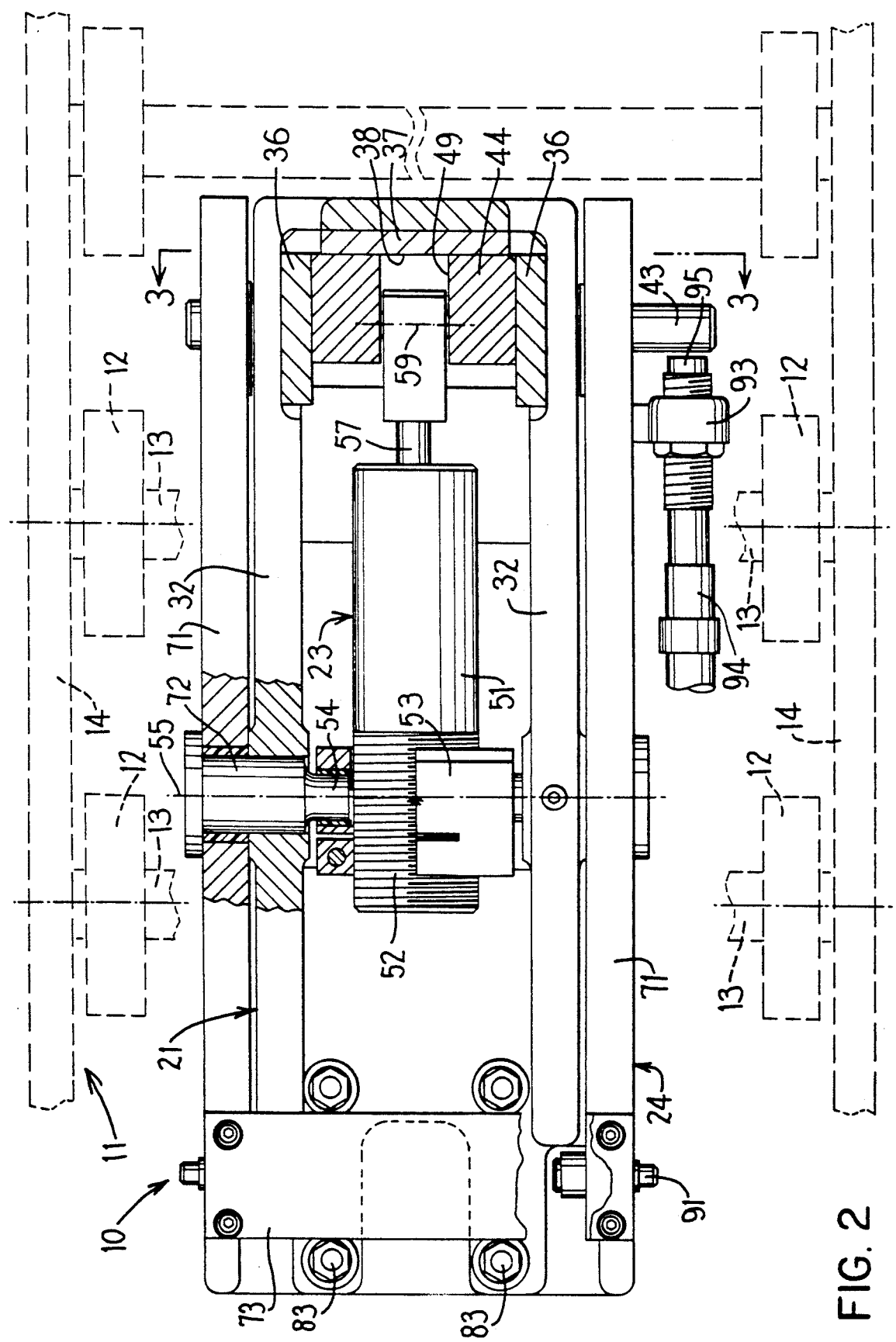
FIG. 2 is a plan view, partially in cross section, of the stopping device shown in FIG. 1. The FIG. 2 position, however, shows the stop lever in the activated position where the pallet has been stopped, namely the dotted position of FIG. 1.

Referring to FIGS. 1 and 2, there is illustrated a cushioned stop device 10 according to the present invention, which device is provided in association with a continuously powered conveyor 11. The conveyor 11 in the illustrated embodiment is a power roller conveyor and includes continuously powered drive rolls 12 supported by through shafts 13 on a suitable support frame 14. Such conveyor typically employs a pair of rolls 12 in sidewardly spaced relationship, which rolls are located adjacent opposite ends of the through shaft 13, with a plurality of such pairs of rolls being disposed in generally uniformly spaced relationship longitudinally along the conveyor. The rolls are continuously driven in any conventional manner, such as by having sprocket engaged with a driving chain.

The uppermost points on the rolls 12 define a generally horizontally extending support plane 15 for providing moving support for loads 16, such as pallets containing workpieces or the like thereon. The loads 16 are movable in a forward direction by engagement with the powered rolls 12, which forward movement direction is indicated by the arrow 17 and is rightwardly in FIGS. 1 and 2. The loads 16 are moved by the conveyor from one workstation to another and are adapted to be held stationary at each workstation by a stopping device such as the device 10.

The stopping device 10 includes a support housing 21 which is adapted to be mounted on the conveyor frame, and which movably mounts thereon a stop structure 22 for engagement with a forwardly-facing surface 19 on the load. A hydraulic shock absorber 23 cooperates with the stop structure 22 for absorbing the dynamic energy of the moving load. A vertical control structure 24 cooperates with the stop structure 22 for effecting raising and lowering thereof between respective activated and deactivated positions, and this control structure 24 is acted upon by an activating device 25.

The support housing 21 is of a cradle-like structure and includes a base wall or plate 31 provided with a pair of side walls or plates 32 projecting vertically upwardly adjacent opposite sides thereof in generally parallel relationship. An upright end wall 33 projects upwardly from the base plate adjacent the forward ends of the side walls, and in fact projects upwardly through a greater vertical extent than the side walls. These walls define a generally upwardly-opening channel-like trough as defined between the side plates. The base plate 31 is adapted to be fixed to the frame of the conveyor, such as to the frame part 34 by means of screws 35. The side walls 32, adjacent the forward ends thereof, are provided with opposed parallel side guide plates 36 fixed thereto and disposed in opposed relationship so as to define an open space therebetween. A further front guide plate 37 is fixed to the inner side of the upright end wall, whereby these plates 36 and 37 cooperate to define a generally three-sided guide channel 38 which opens generally upwardly and rearwardly for permitting confined and controlled movement of the stop structure 22, as described hereinafter.

The support housing 21 also has guide slots 39 which open vertically upwardly from the lower free edges of the side walls 32 adjacent the forward ends thereof. These guide slots 39 are located just rearwardly of the upright end wall 33.

Figure 3:
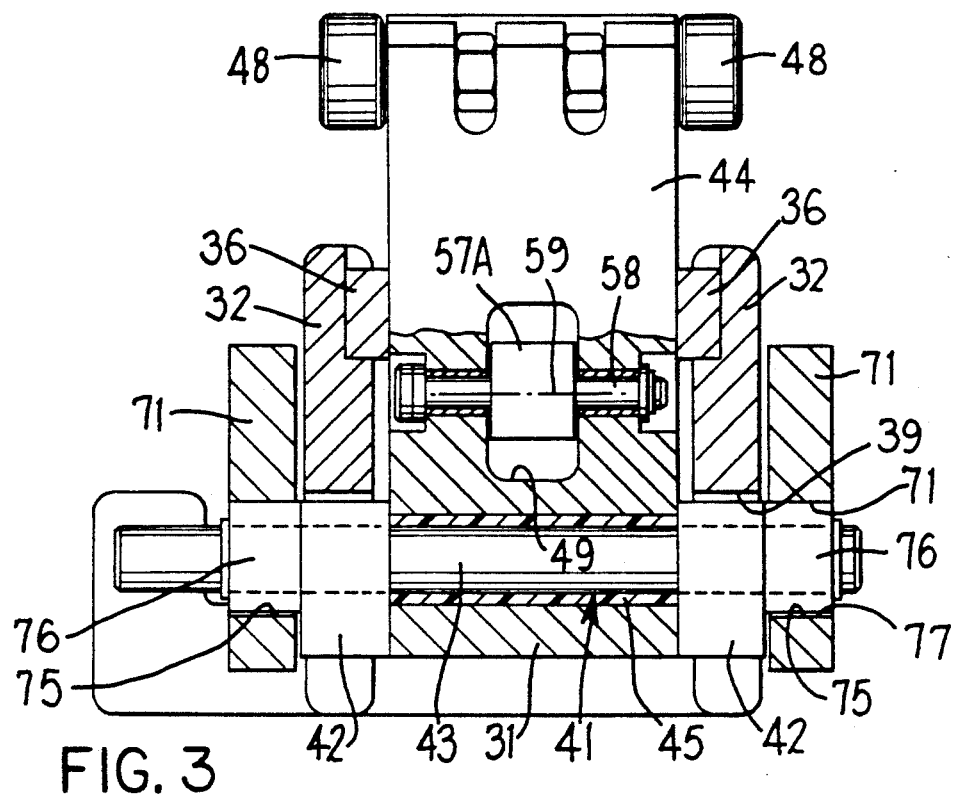
FIG. 3 is a elevational view, partially in cross section, as taken substantially along line 3-3 in FIG. 2.
Figure 4:
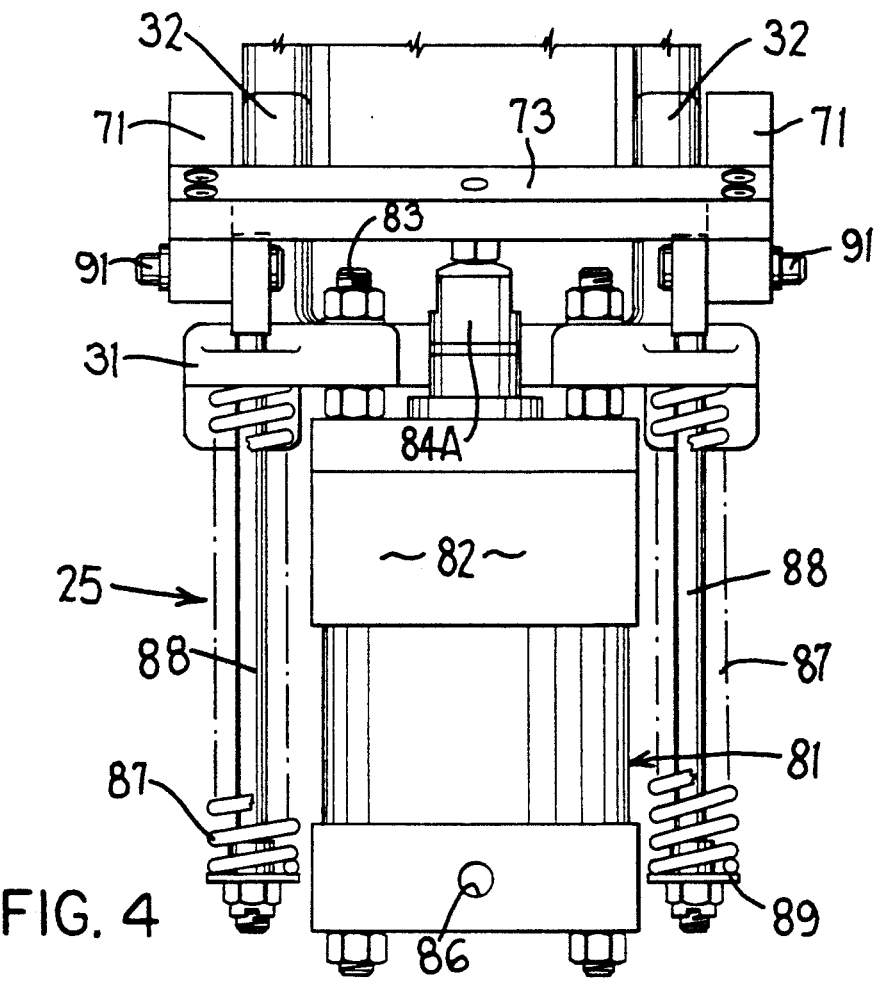
FIG. 4 is an end elevational view taken substantially from the leftward end of FIGS. 1 and 2.

The stop structure 22 includes a vertical slide structure 41 (FIG. 3) which is vertically slidably supported on the support housing 21 and which includes a sidewardly-spaced pair of slide blocks 42 vertically slidably supported in the guide slots 39. These slide blocks 42 are rigidly joined by a horizontally extending transverse pivot shaft 43. The lower end of a vertically-elongated stop lever 44 is disposed between the slide blocks 42 and is pivotally supported on the pivot shaft 43, such as through an intermediate sleeve bearing 45. The stop lever 44 projects upwardly between and substantially above the side walls 32 and, adjacent the upper free end thereof, is provided with an abutment plate 46 on the rearward face thereof. Abutment plate 46 is disposed for contacting the surface of face 19 associated with the load 16. The stop lever 44 also defines a flat contact surface 47 on the back side thereof, which contact surface is adapted to stationarily abut the upright end wall 33 (the latter functioning a stationary stop) for defining the precise stopped position of the load. A pair of rollers 48 are also mounted on the stop lever 44 adjacent the upper free end thereof in straddling relationship thereto. These rollers 48 are disposed adjacent the front upper corner of the stop lever, and the purpose of these rollers is explained hereinafter.

The stop lever 44 also has a central opening 49 extending therethrough, which opening is spaced approximately midway between the upper and lower ends thereof.

The hydraulic shock absorber 23 is pivotally coupled between the stop lever 44 and the support housing 21, and includes a closed but substantially hollow cylindrical housing 51 which is threaded at 52 so as to adjustably but fixedly receive thereon a mounting collar 53. This collar 53 has radially aligned but diametrically opposite openings formed therein for accommodating trunnions 54 which are fixed to and project inwardly from the opposed side walls 32. These trunnions 54 support the shock absorber 23 for vertical swinging or pivotal movement about a pivot axis 55 which extends horizontally in substantially perpendicular relationship to the direction of movement 17 of the load.

The shock absorber 23 includes a piston 56 slidably mounted within the housing and secured to a piston rod 57 which projects outwardly through one end of the housing and has a clevis 57A on the free end thereof which projects into the central opening 49 for pivotal connection to the stop lever 44 through a pivot rod 58. The latter defines a substantially horizontal pivot axis 59 which is parallel to the axis 55, and which is disposed upwardly a significant distance from the pivot shaft 43, but downwardly a significant distance from the abutment or contact plate 46. In this embodiment, as is apparent from FIG. 1, movement of the stop lever 22 from the normal active but noncontacting position shown by solid lines in FIG. 1, to the stop position shown by dotted lines in FIG. 1, results in the stop lever 22 and shock absorber 23 moving through an intermediate position wherein the piston rod 57 of the shock absorber extends in substantially perpendicular relationship to the radial line of action of the stop lever 22. This perpendicular relationship exists substantially when the stop lever is in the stop position as illustrated by dotted lines in FIG. 1, whereby this perpendicular relationship permits maximum utilization of the force generated internally of the shock absorber.

As illustrated by FIG. 1A, the shock absorber defines therein a pressure chamber 61 as defined between the piston 56 and the forward end cap of the housing, and this pressure chamber 61 communicates through a plurality of small orifices 62 as formed in the surrounding liner 63 with a channel 64, the latter communicating through a hole 65 with a further chamber 66 defined on the other side of the piston. These orifices 62 are all of small diameter, and are spaced axially along the liner so that the orifices will be progressively covered up as the piston moves rightwardly in FIG. 1A, thereby progressively decreasing the fluid escape area from the chamber 61 to thus increase the force and energy absorbing characteristics of the shock absorber.

The hydraulic shock absorber also includes an internal spring 69 which surrounds the piston rod 57 and cooperates between the piston and housing so as to normally return the piston 56 to its leftwardmost position when the external extension force is removed from the piston rod 57.

As illustrated by FIG. 1, the shock absorber 23 is effectively positioned within the channel defined between the side walls 32 of the support housing, and is also positioned sidewardly between cooperating pairs of conveyor rolls 12 but is disposed below the support shafts 13 so as to permit use of through shafts 13 for supporting the sidewardly spaced pair of rolls 12.

To control the vertical raising and lowering of the stop structure 22, the control structure 24 includes a pair of horizontally-elongated levers 71 which are disposed in sidewardly spaced and straddling relationship to the support housing 21, with each lever 71 being disposed adjacent but outwardly from a respective one of the side walls 32. Each lever 71 is pivotally supported, adjacent the center thereof, on the respective side wall by a trunnion portion 72 which is fixed to the side wall and projects into and provides for pivotal support of the respective lever 71. This trunnion portion 72, in the illustrated embodiment, is part of and hence coaxially aligned with the trunnion 54. The pair of levers 71, adjacent their rearward ends, are fixedly joined together by a connecting plate 73 which extends perpendicularly therebetween.

Figure 5:
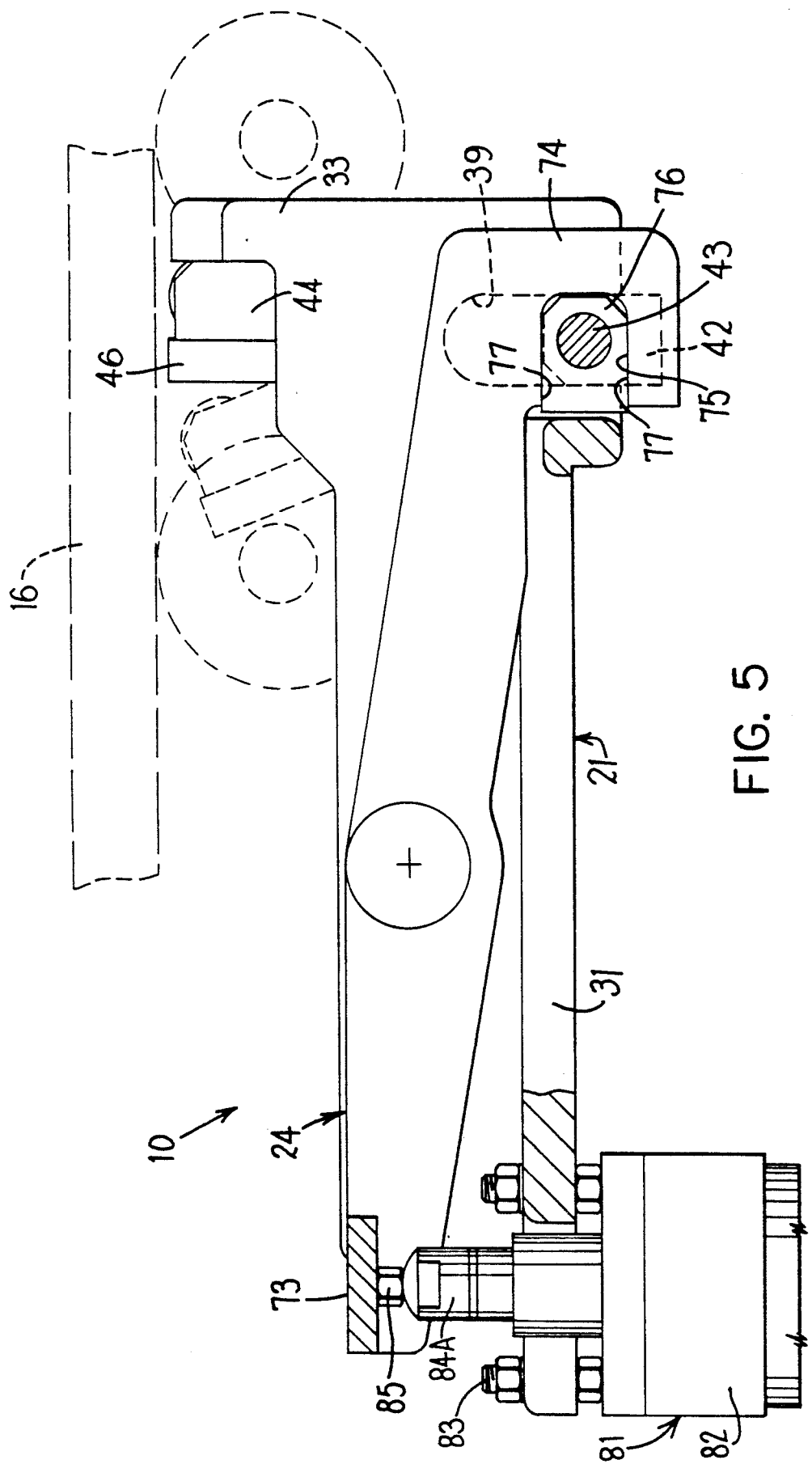
FIG. 5 is a side elevational view of the stopping device shown in its retracted or non-activated position.

Each lever 71 has a hook-like portion 74 (FIG. 5) provided on the front end thereof in the vicinity of the housing end wall 33. This hook-like portion 74 defines therein a guide slot 75 which extends generally horizontally and opens outwardly in a rearward direction toward the trunnion portion 72. The guide slot 75 slidably accommodates therein a guide block 76 which is pivotally supported on the pivot shaft 43 in close proximity to the guide blocks 42 and which comprise part of the slide structure 41. This guide block 76 is closely slidably confined between the upper and lower side walls 77 of the guide slot 75 so as to be movable solely in the lengthwise extent of the slot, and is thus prevented from moving vertically relative to the hook-like end portion 74.

The other or rearward ends of levers 71 cooperate directly the activating device 25. This latter device includes a pressure cylinder 81, preferably an air cylinder, which includes a conventional cylindrical housing 82 which is secured to the base plate 31 by the rods 83. This pressure cylinder 81 includes a conventional piston (not shown) slidably supported interiorly of the housing 82 and fixedly secured to a piston rod 84 which slidably projects upwardly through the housing and has a cap 84A mounted on the upper free end thereof and disposed for abutting contact with a contact element 85 secured to the connecting plate 73. The pressure cylinder 81 is supplied with pressurized fluid, specifically air, through an inlet 86 which supplies air into a pressure chamber disposed below the piston for effecting upward displacement of the piston rod, to then cause corresponding upward lifting of the rearward ends of levers 71.

The activating device 25 also includes a pair of compression springs 87 which are disposed in straddling relationship on opposite sides of the pressure cylinder 81 and which create a continuous downward biasing force on the rearward end of the levers 71 to hence continuously urge the stop structure 22 upwardly. These springs 81 are disposed in surrounding relationship to elongated control rods 88 which extend in parallel relationship in the axial direction of the pressure cylinder. The lower ends of springs 81 bear against washers 89 carried on the lower ends of the control rods 88. The upper ends of these rods 88 slidably project upwardly through the base plate 31 and are pivotally joined to the rearward ends of levers 71 by pivot pins 91.

While springs 87 are mounted exteriorly of the cylinder 81 in the illustrated embodiment, it will be recognized that the springs 87 could be replaced with an equivalent spring(s) disposed interiorly of the cylinder.

One of the side plates 32, adjacent the forward end thereof, also has a sidewardly projecting bracket 93 (FIG. 2) secured thereto, which bracket mounts thereon a proximity switch 94. The proximity switch 94 has a sensor 95 on the end thereof positioned in close proximity to the projecting end of the pivot shaft 43 when the slide structure is in the uppermost position. When the slide structure is moved downwardly, then the projecting end of pivot pin 43 moves downwardly away from the sensor 95 so as to deactivate the switch 94. Operation:

While the operation of the cushioned stop device 10 is believed apparent from the description given above, nevertheless same will be briefly described to ensure a complete understanding thereof.

The stopping device 10 will initially be maintained in the solid line position illustrated by FIG. 1, in which position the stop lever 44 is tilted in an upstream direction about the pivot 43 so as to be spaced away from the fixed stop 37 defined on end plate 33. Further, the slide structure 41 and the stop lever 44 are in their uppermost position so that the abutment plate 46 projects above the plane 15. When the pallet or load 16 approaches the workstation stoppage location 18, the leading edge 19 of the pallet initially contacts the abutment plate 46 substantially as indicated by the dash-dot line position of the pallet in FIG. 1. Further rightward movement of the pallet toward station 18 causes the stop lever 44 to swing clockwise about pivot 43 toward the fixed stop 37. This causes extension of piston rod 57 from its housing 51 and causes compression and hence a significant increase in the pressure of the hydraulic fluid contained in chamber 61. As the lever 44 swings closer to the fixed stop 37, the piston 56 moves rightwardly in FIG. 1A and progressively closes off additional orifices 62, thereby decreasing the total escape area for fluid from chamber 61. This causes the pressure of the fluid in chamber 61 to progressively increase relative to the energy of the load which is absorbed so as to slow down and eventually stop the load 16 as the lever 44 moves through a small angular extent toward the fixed stop 37. By the time the lever abuts the fixed stop 37 and stops the load at the station 18, the shock absorber has effectively absorbed a very high percentage of the energy of the pallet and has effectively stopped the pallet, so that the actual impact against the fixed stop 37 is minimal.

When it is desired to advanced the pallet 16 from station 18 to the next station, then the stop structure 22 is retracted downwardly to disengage the pallet 16, which downward retraction may be initiated either by a master control system, or by a manually-actuated switch which is actuated by an operator located at station 18. Once the operator activates the release switch, this activates a suitable control valve which allows pressurized air to be supplied to the bottom of pressure cylinder 81 so that piston rod 84 is forced upwardly, thereby causing levers 71 to swing clockwise in FIG. 1. The forward (rightward) ends of levers 71 swing downwardly and, due to engagement with the slide blocks 76, cause the slide structure 41 to be moved vertically downwardly along the slots 39. This in turn pulls the stop lever 44 vertically downwardly from the dotted line position illustrated in FIG. 1 until the free upper end of the stop lever passes below the plane 15. This releases the load 16 so that the continually driven conveyor rolls 12 then immediately cause the load 16 to movably advance away from the station 18.

When the slide structure 41 reaches its lowermost position, the projecting end of pivot shaft 43 breaks contact with the proximity switch 94 which, through a suitable control such as a timer, then maintains the pressure cylinder 81 pressurized for a short period of time which is sufficient to permit the pallet to move forwardly at least a small extent, prior to the stop lever 44 again being permitted to raise.

After the stop lever 44 has moved into contact with the stop 37, much of the force applied thereto during stopping of the pallet is or already has been relieved, and the pressure in the shock absorber will automatically decrease in response to the relieving of the external force thereon. Further, when the stop lever 44 has been lowered by activation of pressure cylinder 81 below the plane 15 so as to disengage the load 16, then the internal spring 69 of the shock absorber 23 automatically urges the piston 56 and piston rod 57 rearwardly (leftwardly) so as to force the pressure fluid to return from chamber 66 to chamber 61, and this simultaneously causes the stop lever 44 to swing back (counterclockwise) towards a position wherein it is inclined in the upstream direction. This latter inclined position is indicated by dotted lines in FIG. 5.

After the pressure cylinder 81 is de-energized, then the springs 87 act against and pull the control rods 88 downwardly and hence cause lowering of the rearward ends of levers 71, which causes a corresponding raising of the hook-like portions 74 so that the slide structure 41 and the stop lever 44 is thus raised upwardly. However, since the load 16 is typically still located at least partially at the station 18 when the stop lever 44 is urged upwardly by the springs, then the springs will merely urge the lever 44 upwardly until the rollers 48 contact the underside of the pallet, which rollers will roll along the underside as the pallet advances away from the station 18. When the pallet totally clears the rollers 48, then the springs immediately urge the stop lever 44 upwardly above the plane 15 so as to be in a position to engage the next incoming load 16.

Figure 6:
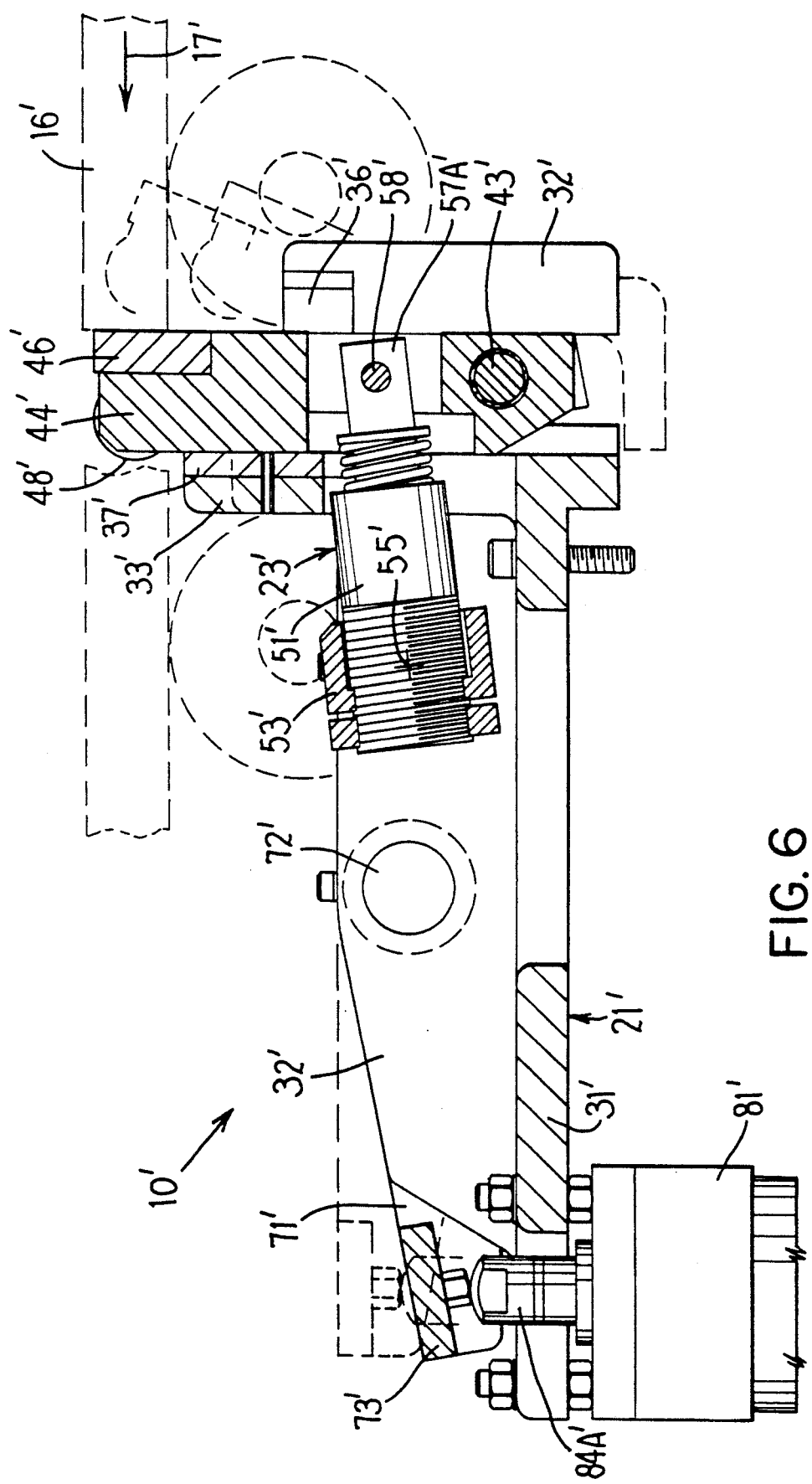
FIG. 6 is a central elevational view similar to FIG. 1 but showing a variation of the stopping device.

Referring now to FIG. 6, there is illustrated a variation of the present invention. In this variation, the shock absorber 23' is of the "push" type in that the push rod 57' moves inwardly when a load is imposed thereon for stopping the pallet. In contrast, the shock absorber 23 of FIG. 1 is of the "pull" type in that the load pulls on and moves the piston rod outwardly when stopping a pallet.

In this variation of FIG. 6, the stopping device 10' again employs the same overall arrangement with respect to structure and function, except that the stop lever 44' swings in the opposite direction relative to the shock absorber, and the support housing 21' is oriented so as to project in a downstream direction relative to pallet movement 17', rather than in an upstream direction as in the FIG. 1 variation. Further, the shock absorber 23' illustrated by FIG. 6 is of smaller capacity and the pivotal mounting or trunnion as provided on the collar 53' of the shock absorber is defined at an axis 55' which is positioned more closely adjacent the stop plate 37', which axis is spaced from the trunnions 72' which pivotally supports the control levers 71'.

Other than the variations as briefly described above, the FIG. 6 embodiment is otherwise structurally and functionally the same as the FIG. 1 embodiment, and the same reference numerals has been utilized to designate corresponding parts but with the addition of a prime (') thereto. Further detailed description of this FIG. 6 embodiment is thus believed unnecessary.

While the stopping device has been illustrated and described above in relationship to a powered conveyor of the type using powered drive rolls 12 supported by through shafts 13, and while the stopping device 10 of this invention is particularly desirable for use on a powered conveyor of this latter type, nevertheless it will be appreciated that the stopping device 10 of this invention is also suitable for use of other types of conventional powered conveyors. For example, the stopping device of this invention could also be desirably used on a powered conveyor of the traveling chain type wherein the loads are supported on and movably advanced by continuously driven drive chains.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A hydraulically-cushioned stop mechanism for decelerating and stopping at a predetermined location a load which is supported on a powered conveyor and is moved therealong in a first direction which is substantially horizontal, comprising:

a stationary support housing defining thereon a fixed stop;

a movable stop structure mounted on said housing for movement between an operative position wherein the stop structure projects into the path of movement of the load to restrict movement thereof and inoperative position wherein the stop structure is retracted so as to not restrict movement of the load;

said stop structure including a slide structure slidably mounted on said support housing for movement in a second direction betwen first and second positions which correspond to said operative and inoperative positions respectively, said second direction extending transversely relative to said first direction;

said stop structure also including a stop member movably mounted on said slide structure for movement in said first direction from a load contacting position to a load stopped position, said stop member being in abutting contact with said fixed stop when in said load stopped position;

hydraulic shock absorber means connected to said stop member for applying a resistance force thereto for decelerating the load which contacts the stop member at said contacting position as the load drives the stop member toward said stopped position, said shock absorber means including a hydraulic pressure chamber containing a hydraulic liquid which is pressurized for creating said resistance force when the load contacts the stop member;

said shock absorber means including orifice means for controlling discharge of said hydraulic liquid from said pressure chamber as the load moves from said contacting position toward said stopped position, said orifice means being of maximum cross sectional flow area at said contact position and being of progressively decreasing cross sectional area for decelerating and stopping the load as the load approaches said stopped position;

biasing means for continuously urging said stop structure in a direction toward said operative position; and activating means for positively moving said stop structure from said operative position into said inoperative position.

2. A stop mechanism according to claim 1, wherein said stop member is pivotally connected adjacent one end thereof to said slide structure, said stop member adjacent the other end thereof having a contact portion adapted for contact with the load; and said shock absorber means including a housing member and a piston member which are mounted for relative sliding movement and which cooperate to define said pressure chamber therebetween, one of said members being pivotally supported on said support housing, the other of said members being pivotally connected to said stop member at a location disposed intermediate the ends thereof, all of said last-mentioned axis extending in substantially perpendicular relationship to said first direction.

3. A stop mechanism according to claim 2, wherein said housing and piston members of said shock absorber means are relatively slidably movable with respect to one another along a line of movement which extends in substantially perpendicular relationship to the elongated direction of said stop member when said stop member is disposed at or in close proximity to said stopped position.

4. A stop mechanism according to claim 3, including elongate control lever means pivotally supported intermediate the ends thereof on said support housing for pivotal movement about an axis which extends generally parallel with said aforementioned axes, said control lever means at one end thereof being pivotally joined to said slide means for controlling movement thereof between said first and second positions, and said biasing means and said activating means being coupled to said control lever means adjacent the other end thereof for controlling movement thereof.

5. A hydraulically-cushioned stop mechanism for decelerating and stopping a moving load on a continuously-driving conveyor, comprising:

a horizontally-elongated housing structure having a base wall and a pair of upstanding side walls which define a channel-like arrangement, said side walls having vertically-elongated guide channels formed therein adjacent one end of said housing structure;

said housing structure having an upright wall fixed thereto adjacent said one end thereof and defining thereon a fixed stop which extends transversely of said housing structure, said fixed stop defining thereon an enlarged stop surface which faces generally in the elongated direction of the housing structure;

a slide structure slidably mounted on said housing structure for vertical slidable displacement within said guide channels;

a vertically-elongated stop lever positioned generally between said side walls and projecting upwardly thereabove, said stop lever being positioned adjacent said one end of said housing structure in the vicinity of said fixed stop, said stop lever having a lower end thereof pivotally supported on said slide structure about a generally horizontal first pivot axis which extends substantially transversely with respect to the elongated direction of said housing structure, said stop lever having an upper free end defining thereon an abutment portion adapted for contact with the moving load, said stop lever also defining thereon a stopping surface on the opposite side thereof from said abutment portion for abuttingly contacting the stop surface on said fixed stop;

hydraulic shock absorber means cooperating between said housing structure and said stop lever for applying a resistance force to said stop lever which restricts swinging of the stop lever as it is moved toward the fixed stop due to contact of the stop lever with a moving load, said hydraulic shock absorber means including slidably telescopically supported housing and piston members which cooperate to define a liquid-containing pressure chamber therebetween, one of said members being pivotally supported on said housing structure about a second axis which is substantially parallel with said first axis and is spaced horizontally therefrom, the other said member being pivotally coupled to said stop lever at a third axis which is generally parallel with said first axis, said third axis being spaced upwardly from said first axis but downwardly a significant distance from said abutment portion, whereby the mounting of the hydraulic shock absorber means relative to said stop lever results in telescopic movement of said shock absorber means occurring along a line of movement which extends in approximately perpendicular relationship to the elongated direction of said stop lever; and activating means coupled to said slide means for controlling vertical movement thereof along said guide channels between raised and lowered positions to cause corresponding movement of said stop lever between respective operative and inoperative positions, said stop lever when in said operative position being disposed so that the abutment portion can contact a moving load, said stop lever when in said inoperative position being disposed so that the abutment portion is incapable of contacting a moving load.

6. A stop mechanism according to claim 5, wherein said activating means includes spring means which cooperate with said slide means for imposing a continuous upwardly-directed biasing force thereto which tends to continuously urge the slide means into its raised position, and fluid pressure cylinder means for selectively moving said slide means downwardly into said lowered position for moving said abutment portion into said inoperative position.

7. A stop mechanism according to claim 6, wherein said activating means includes a generally horizontally elongate control lever having one end thereof pivotally connected to said slide means, said control lever at an intermediate location thereof being pivotally supported on said housing structure for pivoting movement about a fourth axis which is generally parallel with said first axis, and said fluid pressure cylinder means being coupled to said housing structure and having a movable piston rod which coacts with the other end of said control lever for swingably moving said control lever to move said slide means downwardly when the fluid pressure cylinder means is activated.

8. A stop mechanism according to claim 7, wherein said fluid pressure cylinder means is mounted to and projects downwardly from said housing structure adjacent the other end thereof, and said spring means being positioned adjacent the other end of said housing structure and cooperating between said housing structure and said other end of said control lever for normally biasing said other end of end of said control lever downwardly.

9. A stop mechanism according to claim 5, wherein said side walls define thereon directly facing and sidewardly spaced guide surfaces which are directly opposed to one another and extend in generally parallel vertical planes, and said stop lever having side surfaces which are slidably guided on said guide surfaces.

10. A stop mechanism according to claim 5, wherein said hydraulic shock absorbers means includes orifice means communicating with said pressure chamber for permitting escape of pressurized liquid therefrom as the housing and piston members slidably telescope with respect to one another due to pivotal movement of said stop lever toward said fixed stop, said orifice means being of progressively decreasing cross sectional flow area as said housing and piston members are slidably telescoped due to swinging movement of said stop lever toward said fixed stop.

11. A stop mechanism according to claim 5, wherein said hydraulic shock absorbers means is positioned so as to lie substantially within the channel-like space between said side walls.

12. A stop mechanism according to claim 5, including roller means mounted on said stop lever adjacent the free end thereof and positioned for rollingly abuttingly engaging the underside of the load if the stop lever is moved upwardly toward the operative position when the load is still disposed thereabove.

13. An apparatus for supporting and successively moving a series of heavy loads, such as palletized loads, into and through a series of workstations with the individual loads being decelerated and stopped at successive workstations, comprising:

powered conveyor means for supporting and moving loads along a substantially horizontal predetermined direction, said powered conveyor means including a plurality of continuously driven drive rollers for supporting and moving the loads, said drive rollers being supported on a stationary frame;

said plurality of drive rollers including a plurality of roller sets disposed in spaced relationship along the predetermined direction of the conveyor means, each said roller set including at least two substantially coaxially aligned drive rollers which are sidewardly spaced a substantial distance apart and are supported on and joined by a transversely-extending through shaft;

a hydraulically-cushioned stop mechanism mounted on said frame for decelerating and stopping a load at a predetermined position along the conveyor means even though the drive rollers remain in driving engagement with the load, said stop mechanism being disposed sidewardly substantially between the sidewardly spaced drive rollers of said sets and positioned closely adjacent but under said through shafts, said mechanism including:

a support housing fixedly mounted on said frame at a location disposed sidewardly between the rollers of the sets and under but closely adjacent the through shafts, said support housing defining thereon vertically-extending guide means, a fixed stop fixedly secured to said housing structure and projecting upwardly to an elevation close to but spaced slightly below a generally horizontal load-supporting plane defined by uppermost load-contacting points of said drive rolls, said fixed stop defining thereon a generally vertically-enlarged stop surface which faces generally in an upstream direction of the conveyor means, a stop structure movably mounted on said support housing for generally vertical movement between raised operative and lowered inoperative positions, and for generally horizontal movement from a load contacting position to a load stopped position, said load contacting position being spaced in the upstream direction from said load stopped position, said stop structure including a slide structure slidably supported on said guide structure for vertical slidable support between said operative and inoperative positions, and a vertically-elongate stop lever having a lower end thereof coupled to said slide structure, said stop lever being supported for swinging movement about a generally horizontal pivot axis which extends through the lower end of said stop lever and extends in generally perpendicular relationship to the predetermined direction, said stop lever having an abutment part mounted thereon adjacent the free end thereof for contact with a load when the stop structure is in said operative position, said stop lever also defining thereon a stopping surface which is disposed on the opposite side of said stop lever from said abutment part, said stopping surface being disposed in generally opposed relationship to said stop surface for contacting said stop surface when in said load stopped position, and hydraulic shock absorber means cooperating between said housing structure and said stop lever for applying a resistance force to said stop lever which restricts swinging movement of the stop lever as it moves toward the fixed stop due to contact of the stop lever with a moving load, said shock absorber being elongated approximately parallel with said predetermined direction and positioned closely adjacent but under said through shafts so that the resistance force applied by the shock absorber to the stop lever when the latter moves toward the stopped position approaches a perpendicular relationship.

14. An apparatus according to claim 13, wherein the stop mechanism includes activating means coupled to the slide structure for controlling vertical movement thereof between said raised and lowered positions to cause corresponding movement of said stop lever between the respective operative and inoperative positions, said activating means being positioned generally between the drive rollers of said sets but disposed downwardly below said through shafts.

15. An apparatus according to claim 14, wherein said activating means includes fluid pressure cylinder means for selectively moving said slide structure downwardly into said lowered position to effect movement of said abutment part into said inoperative position.

16. An apparatus according to claim 15, wherein said activating means includes spring means for imposing an upwardly-directed biasing force on said slide structure which continuously urges said stop structure toward said operative position.

17. An apparatus according to claim 16, wherein said fluid pressure cylinder means and said spring means are mounted to and carried by said support housing so that said stop mechanism constitutes a unitized structure which can be maintained in fully assembled and unitized relationship when disconnected from the frame.

18. An apparatus according to claim 13, wherein said hydraulic shock absorber means includes slidably telescopically supported housing and piston members which cooperate to define a liquid-containing pressure chamber therebetween, and orifice means communicating with said pressure chamber for permitting escape of pressurized fluid therefrom as the housing and piston members slidably telescope with respect to one another due to pivotal movement of said stop lever toward said fixed stop, said orifice means being of progressively decreasing cross sectional flow area as said housing and piston members are slidably telescoped due to swinging movement of said stop lever toward said fixed stop.

19. An apparatus for supporting and successively moving a series of heavy loads, such as palletized loads, into and through a series of workstations with the individual loads being decelerated and stopped at successive workstations, comprising:

powered conveyor means for supporting and moving loads along a substantially horizontal predetermined direction, said powered conveyor means including a plurality of continuously driven drive elements for supporting and moving the loads, said drive elements being supported on a stationary frame in sidewardly spaced relationship;

a hydraulically-cushioned stop mechanism mounted on said frame for decelerating and stopping a load at a predetermined position along the conveyor means even though the drive elements remain in driving engagement with the load, said stop mechanism being disposed sidewardly substantially between the sidewardly spaced drive elements, said mechanism including:

a support housing fixedly mounted on said frame at a location disposed sidewardly between the drive elements, a fixed stop fixedly secured to said housing structure and projecting upwardly to an elevation close to but spaced slightly below a generally horizontal load-supporting plane defined by uppermost load-contacting points of said drive elements, said fixed stop defining thereon a generally vertically-enlarged stop surface which faces generally in an upstream direction of the conveyor means, a stop structure movably mounted on said support housing for generally vertical movement between raised operative and lowered inoperative positions, and for generally horizontal movement from a load contacting position to a load stopped position, said load contacting position being spaced in the upstream direction from said load stopped position, said stop structure including a slide structure slidably supported on said guide structure for vertical slidable support between said operative and inoperative positions, and a vertically-elongate stop lever having a lower end thereof coupled to said slide structure, said stop lever being supported for swinging movement about a generally horizontal pivot axis which extends through the lower end of said stop lever and extends in generally perpendicular relationship to the predetermined direction, said stop lever having an abutment part mounted thereon adjacent the free end thereof for contact with a load when the stop structure is in said operative position, said stop lever also defining thereon a stopping surface which is disposed on the opposite side of said stop lever from said abutment part, said stopping surface being disposed in generally opposed relationship to said stop surface for contacting said stop surface when in said load stopped position, and hydraulic shock absorber means cooperating between said housing structure and said stop lever for applying a resistance force to said stop lever which restricts swinging movement of the stop lever as it moves toward the fixed stop due to contact of the stop lever with a moving load, said shock absorber being elongated approximately parallel with said predetermined direction and positioned closely adjacent but under said through shafts so that the resistance force applied by the shock absorber to the stop lever when the latter moves toward the stopped position approaches a perpendicular relationship.

20. An apparatus according to claim 19, wherein said hydraulic shock absorber means includes slidably telescopically supported housing and piston members which cooperate to define a liquid-containing pressure chamber therebetween, and orifice means communicating with said pressure chamber for permitting escape of pressurized fluid therefrom as the housing and piston members slidably telescope with respect to one another due to pivotal movement of said stop lever toward said fixed stop, said orifice means being of progressively decreasing cross sectional flow area as said housing and piston members are slidably telescoped due to swinging movement of said stop lever toward said fixed stop.

* * * * *